3,291,861
ADHESIONABLE POLYOLEFIN BLENDS
Armand Francis Lewis, Fairfield, Conn., assignor to American Cyanamid Company, Stamford, Conn., a corporation of Maine
No Drawing. Filed Aug. 1, 1963, Ser. No. 299,147
8 Claims. (Cl. 260—876)

The present invention relates to novel adhesive compositions. More particularly, it is concerned with mixtures of an adhesionable vinyl-modified polyolefin and untreated polyolefin in well-defined proportions.

In a copending application for Letters Patent, Serial No. 77,803 of L. J. Forrestal and A. F. Lewis, filed on December 23, 1960, now Patent No. 3,155,744 there is disclosed a vinyl-modified polyolefin useful as an adhesive in the bonding of metal surfaces to an extent hitherto unrealized. However, such vinyl-modified polyolefins are relatively expensive to prepare. If the highly desirable adhesionable polyolefin could be prepared more economically, such adhesives would invite a broader base of users.

It is, therefore, a principal object of the present invention to provide an adhesionable composition comprising a vinyl-modified polyolefin which is economical to prepare. It is a further object of the invention to physically modify the vinyl-modified polyolefin defined in the above-mentioned copending application so as to retain its original adhesiveness and, in some instances, to improve this property. Other objects and advantages will become apparent to those skilled in the art from a consideration of the following detailed description.

To this end, it has been surprisingly found that a physical mixture of a vinyl-modified polyolefin and an untreated polyolefin can be prepared in a manner in which the admixture is compatible. Unexpectedly, the adhesive or binding properties of the vinyl-modified polymers are not impaired and, in some instances, improved as a result of the dilution with untreated polyolefins. Controlled adhesion is thereby achieved by varying the aforementioned physical mixture.

According to the invention, a mixture of one part of vinyl-modified polyolefin and from about 0.25 part to about 4 parts of untreated polyolefin are physically admixed. In this way, a mixture is found to be as effective or more effective than the undiluted vinyl-modified polyolefin defined in the aforementioned copending application.

In general, a vinyl monomer that the modified polyolefin is prepared from normally homopolymerizes to a low degree of polymerization which monomer is caused to react with an irradiated polyolefin. Advantageously, the reaction occurs either when utilizing previously irradiated polyolefins, or when the polyolefin and the vinyl monomer are simultaneously irradiated. Thus, the polyolefin and the vinyl monomer react to form a moldable and extrudable polymer which is not highly crosslinked. It is further surprisingly found that the reaction herein, which involves the grafting of a monomer to a polymer, contemplates solely a low degree of crosslink-polymerization. Contrary to expectations, grafting of the monomer to the polymer does not result in additional crosslinking. However, the process does result in placing side substituents or chains onto the polyolefin. These chains do not cause the resultant modified polymer to become non-moldable and non-extrudable, indicating that additional crosslinking did not occur during the aforementioned reaction. Resultant modified polymer is found to increase in weight from about 0.1% to about 20.0%.

Illustrative vinyl monomers, which are within the purview of the present invention, are:

(1) Bis-(2-chloroethyl)vinyl phosphonate
   $[(ClCH_2CH_2O)_2POCH=CH_2]$
(2) Vinyl phosphonic acid
   $[CH_2=CHPO(OH)_2]$
(3) Paravinyl phenyl boronic acid
   $[CH_2=CH-\langle\phantom{xx}\rangle-B(OH)_2]$
(4) Paravinyl benzyl sulfonic acid
   $[CH_2=CH-\langle\phantom{xx}\rangle-CH_2SO_3H]$ and alkali metal salts thereof. Exemplary of such alkali metals are sodium, potassium and lithium.

It is generally a good practice to utilize from about 0.5 to 10.0 parts by weight of the monomer per part of polymer. Preferably, a range from about 2 to about 5 parts of monomer per part of polymer is used for optimum operation.

Contemplated polyolefins include either polyethylenes or polypropylenes of high average molecular weight in the range of from about 20,000 to 250,000. The polyolefin may be in the form of discrete particles, films, strips or fibers. Grafting of the monomer onto the polyolefin may concurrently take place in the presence of irradiation. Alternatively, and preferably, the polyolefin can be irradiated prior to vinyl monomer reaction.

Radiation utilized in accordance with the process of the instant invention can be of several types. One type of radiation is particulate radiation, such as $\alpha$-particles and $\beta$-radiation (that is, electrons), obtained from radioactive nuclei or high-energy electrons from machine sources. Another type of radiation contemplated herein is electro-magnetic radiation, such as gamma-rays and X-rays. However, a preferred source of radiation is a beam of high-energy electrons (e.g. from about 0.5–3 million electron-volt electrons).

In general, it has been found that for ionizing radiation a total dose from 10,000 to 30,000,000 rads can be effectively tolerated. A rad is defined as equal to 100 ergs of actual energy absorbed per gram of material treated. Optimum results, however, are obtained when from 75,000 to 1,200,000 rads are absorbed.

Reaction between the irradiated polymer and the monomer occurs within ten to fifty hours. Usually, from twelve to about twenty hours are sufficient and is a good operating practice.

Advantageously, the untreated polyolefin may be admixed in any desired particulate form. For instance, either powders of polyethylene or polypropylene having an average diameter from about 100 to about 350 microns or flakes of the same can be employed herein. As stated above, from about 0.25 part to about 4 parts of untreated polyolefin can be incorporated into one part of the above-defined vinyl-modified polyolefin.

The following examples will serve to further illustrate the invention. It is understood, they are to be taken as illustrative only and are not to be taken as limitative thereof. All parts are by weight, unless otherwise noted.

These examples illustrate the preparation of the above-described vinyl-modified polyolefins.

*Example A*

3.8 parts of powdered polypropylene are irradiated under a reduced pressure of about 0.001 mm. Hg. When a dose of about one million rads, obtained from 250 kilovolt peak (KVP) X-rays utilizing a General Electric unit, is imparted to the polypropylene, the radiation is terminated. The so-irradiated polymer is next contacted with 13 parts of bis-(2-chloroethyl) vinyl phosphonate for about twelve hours. The treated polymer is washed with ethanol to remove any traces of alcoholic soluble unreacted monomer. The washed polymer is placed in a vacuum oven and dried.

Resultant polymer is found to increase 2.8% in weight indicating reaction between the monomer and polymer.

*Example B*

Example A is repeated in every material detail except that a sheet (1 mil thick) polypropylene is substituted for the powdered polypropylene and the contact time between the irradiated polymer and reactive monomer is forty-eight hours rather than twelve hours.

A 1% increase in the weight of the film is found.

*Example C*

3.0 parts of polyethylene are irradiated under a reduced pressure of 0.001 mm. Hg with (3) million electron volt (m.e.v.) electrons from a Van de Graaff generator. After receiving a dose of about three million rads, the irradiation is discontinued and 13 parts of bis-(2-chloroethyl) vinyl phosphonate are brought into contact with the irradiated polymer for forty-eight hours. The polymer is further treated as in Example A above to remove traces of the monomer and its homopolymer.

The resultant polymer is found to increase 3.0% in weight indicating polymer and monomer reaction.

The polymers formed in each of the above examples are admixed with varying proportions of the untreated polyolefins. They are found to be compatible.

For purposes of illustrating the adhesion properties of the blended polymers, mixtures of treated vinyl-modified polypropylene having either a 5.4 percent or a 2.3 percent bis-(2-chloroethyl) vinyl phosphonate graft and untreated polypropylene are exemplified below as valuable adhesives in bonding metal to metal. Adhesion tests are performed by heating cleaned metal test blocks to about 550° F., placing the modified polymers of each example between adjacent surfaces of two blocks and thereafter sandwiching the modified polymer therebetween while maintaining the elevated temperature. This enables the establishment of a smooth coating of melted polymer to be deposited on the metal contacting surface. The two blocks are then contacted and pressed together while the resin is sufficiently fluid to form a butt-joint adhesive test sample. The sample blocks are next cooled to room temperature and stored for twenty-four hours before they are tested for tensile rupture in a Baldwin Testing Machine as is substantially described in A.S.T.M., C297–52T.

The results of these tests are recorded in Table I below.

TABLE I.—ADHESION PROPERTIES OF PHYSICAL BLENDS OF BIS-(2-CHLOROETHYL) VINYL PHOSPHONATE (BCVP) GRAFTED POLYPROPYLENE POWDER (PP) AND UNTREATED POLYPROPYLENE POWDER

| | Blend | | Adhesion Tensile Strength (p.s.i.) (Blends with 5.4% BCVP Graft) | | | Adhesion Tensile Strength (p.s.i.) (Blends with 2.3% BCVP Graft) | | | Type of Failure* |
|---|---|---|---|---|---|---|---|---|---|
| | Parts BCVP Grafted PP | Parts Untreated Polypropylene | Aluminum | Copper | Steel | Aluminum | Copper | Steel | |
| Ex. 1 | 1 | 0 | 2,800 | 2,100 | 3,000 | 3,000 | 3,000 | 3,100 | C. |
| Ex. 2 | 1 | 0.25 | 2,600 | 2,700 | 2,000 | 3,200 | 3,000 | 2,900 | C. |
| Ex. 3 | 1 | 0.5 | 2,700 | 2,900 | 2,200 | 3,200 | 3,100 | 2,300 | C. |
| Ex. 4 | 1 | 1 | 2,600 | 3,200 | 1,600 | 3,000 | 3,100 | 3,000 | C. |
| Ex. 5 | 1 | 2 | 1,900 | 2,400 | 2,900 | 1,800 | 2,800 | 3,300 | C. |
| Ex. 6 | 1 | 4 | 1,900 | 2,100 | 2,700 | 1,500 | 1,700 | 2,600 | C. |
| Ex. 7 | 0 | 1 | 500 | 200 | 500 | 500 | 200 | 500 | B. |

*B = Failure at the boundary. C = Cohesive failure.

*Example D*

Substituting a 10% aqueous solution of vinyl-phosphonic acid for the phosphonate in the procedure of Example A above, a polymer is obtained which increased 3.5% in weight when repeating Example A in every material detail.

*Example E*

Repeating in every material detail the procedure of Example A, except that a 30% solution of p-vinylphenyl boronic acid in ethanol is substituted for the bis-(2-chloroethyl) vinyl phosphonate monomer.

Resultant polymer is obtained which increases in weight by 1%.

*Example F*

The procedure of Example A is repeated except that the sodium salt of p-vinyl benzyl sulfonic acid is grafted from a saturated aqueous solution onto polypropylene at the termination of the polymer radiation. Resultant polymer is ultimately treated with hydrochloric acid to obtain the free acid.

*Example G*

4 parts of powdered polypropylene are intimately admixed with 15 parts of bis-(2-chloroethyl) vinyl phosphonate. The mixture is then subjected to ionizing radiation of one million electronvolt electrons. The so-treated polymer is washed with ethanol whereby traces of unreacted monomer and poly-bis-(2-chloroethyl) vinyl phosphonate are removed and recovered.

The washed polymer is found to increase about 3.0% in weight which indicates that reaction between the polymer and monomer occurs.

It is readily apparent from a consideration of the above table that the adhesive properties attributed to the blended polymers of the present invention are at least equal in performance to the modified polymers per se. Desired cohesive failure, characteristic of the polymeric blend of the present invention, occurs at an exceptionally high adhesion joint-strength level. Such cohesive failure obtains within the polymer blend per se in contradistinction to failure at the boundary wherein the surfaces to be joined are separated at a low adhesion joint-strength level. This occurs when untreated polypropylene powder is employed.

Similar results as shown in Table I above are obtained utilizing blends of grafted polymers prepared in Examples C through F above and untreated polymers in proportions recited in said table.

I claim:

1. A novel controlled adhesive polymeric, blended composition in particulate form comprising (a) one part of adhesionable, irradiated, vinyl-modified polyolefin, said polyolefin being selected from the group consisting of polyethylene and polypropylene, and said vinyl group being grafted thereon and selected from the group consisting of bis-(2-chloroethyl) vinyl phosphonate, vinyl phosphonic acid, p-vinylphenyl boronic acid, p-vinyl benzyl sulfonic acid and the alkali metal salts thereof, said vinyl-modified polymer being increased in weight of from about 0.1 percent to about 20 percent, and (b) from about 0.25 part to about 4 parts untreated polyolefin.

2. The composition according to claim 1, in which the polyolefin is polyethylene.

3. The composition according to claim 1, in which the polyolefin is polypropylene.

4. The composition according to claim 3, in which the monomer is bis-(2-chloroethyl) vinyl phosphonate.

5. The composition according to claim 3, in which the monomer is vinyl phosphonic acid.

6. The composition according to claim 3, in which the monomer is p-vinylphenyl boronic acid.

7. The composition according to claim 3, in which the monomer is p-vinyl benzyl sulfonic acid.

8. The composition according to claim 1, in which the vinyl-modified polyolefin and untreated polyolefin are present in a ratio of 1:1, respectively.

References Cited by the Examiner
UNITED STATES PATENTS

| | | | |
|---|---|---|---|
| 3,027,346 | 3/1962 | Rugg et al. | 260—878 |
| 3,155,744 | 4/1964 | Forrestal et al. | 260—877 |

MURRAY TILLMAN, *Primary Examiner.*

D. J. BREZNER, *Assistant Examiner.*